United States Patent [19]

Volz et al.

[11] Patent Number: 4,589,489
[45] Date of Patent: May 20, 1986

[54] PROCESS FOR RECOVERING OIL FROM SUBTERRANEAN FORMATIONS

[76] Inventors: Hartwig Volz, Westcellertorstrasse 15a, D-3100 Celle; Frank-Michael Schnepel, Solferino-Weg 20 (144), D-7000 Stuttgart 80, both of Fed. Rep. of Germany

[21] Appl. No.: 672,543

[22] Filed: Nov. 19, 1984

Related U.S. Application Data

[63] Continuation-in-part of Ser. No. 478,020, Mar. 23, 1983, abandoned.

[51] Int. Cl.$^4$ .............................................. E21B 43/16
[52] U.S. Cl. ...................................... 166/274; 166/273
[58] Field of Search ........................ 166/273, 274, 275; 258/8.55 D

[56] References Cited

U.S. PATENT DOCUMENTS

| | | | |
|---|---|---|---|
| 3,414,054 | 12/1968 | Bernard | 166/9 |
| 3,469,630 | 9/1969 | Hurd et al. | 166/250 |
| 3,688,844 | 9/1972 | Roszelle | 166/274 |
| 3,692,113 | 9/1972 | Norton et al. | 166/275 |
| 3,882,939 | 5/1975 | McAtee et al. | 166/274 |
| 3,946,811 | 3/1976 | Norton et al. | 166/274 |
| 4,005,749 | 1/1977 | Birk et al. | 166/273 |
| 4,133,385 | 1/1979 | Kalfoglou | 166/273 |
| 4,142,582 | 3/1979 | Kalfoglou | 166/273 |
| 4,172,497 | 10/1979 | Kalfoglou | 166/273 |
| 4,313,500 | 2/1982 | Johnson, Jr. et al. | 166/273 |
| 4,360,061 | 11/1982 | Canter et al. | 166/274 |

FOREIGN PATENT DOCUMENTS

0044508 of 0000 European Pat. Off. .

OTHER PUBLICATIONS

A. C. Uzoigwe, F. C. Scanlon, R. L. Jewett, "Improvements in Polymer Flooding", Journal of Petroleum Technology, Jan. 1974, pp. 33–41.
G. Alexander, "Preparation of Glass Capillary Columns", Chromatographia, vol. 13, No. 10, Oct. 1980, p. 657.
J. Klein and A. Westerkamp, "Comparative Adsorption Studies . . . ", Angew. Makromolekulare Chemie 92 (1980), p. 24.

Primary Examiner—Stephen J. Novosad
Assistant Examiner—Bruce M. Kisliuk
Attorney, Agent, or Firm—Jack H. Park; Kenneth R. Priem; Harold J. Delhommer

[57] ABSTRACT

Disclosed is a method of using polymer flooding solutions in tertiary oil recovery operations in which the loss of relatively high molecular weight polymers to the formation is substantially reduced by the use of aqueous solutions of polyethylene glycol or polypropylene glycol or both, having a molecular weight of from about 600 to about 1200. The method is particularly effective under high salinity conditions.

8 Claims, 3 Drawing Figures

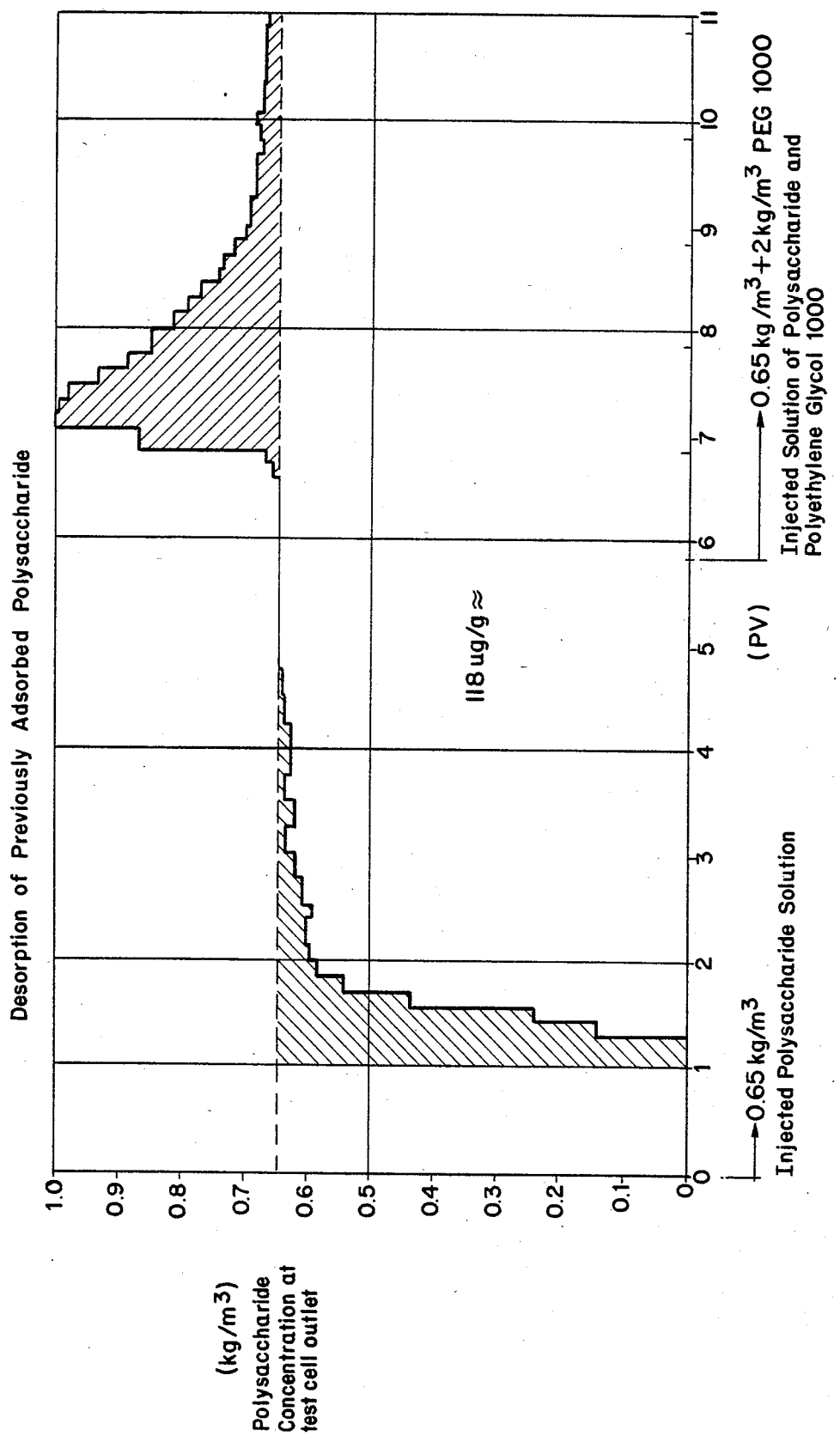

PROCESS FOR RECOVERING OIL FROM SUBTERRANEAN FORMATIONS

TECHNICAL FIELD OF THE INVENTION

This application is a continuation-in-part of U.S. Pat. application Ser. No. 06/478,020, filed Mar. 23, 1983 now abandoned.

The invention relates to a process for recovering oil from a subterranean formation by flooding a formation with an aqueous solution of viscosity increasing polymers. More particularly, the invention concerns the addition of polyalkylene glycol in solution to substantially reduce polymer adsorption.

BACKGROUND OF THE INVENTION

It has long been recognized that the degree of oil recovery by water flooding underground formations decreases as the viscosity of formation oil increases. Under unfavorable viscosity conditions the water, which is highly liquid as compared to oil, tends to finger from an injection well towards a production well so that only a small fraction of the total formation is swept by the oil-displacing water. The swept proportion of the formation and the subsequent oil recovered may be increased considerably when the viscosity of the flooding water is significantly increased by dissolving high molecular weight, water soluble polymers therein.

There are only a few classes of polymers that are suitable for such polymer flooding. In their order of technical importance these are the polyacrylamides, which are mostly partially hydrolyzed; the polysaccharides, which are prepared biologically; and the cellulose ethers, in particular hydroxyethyl cellulose. Furthermore, certain copolymers such as those disclosed in European Patent No. A2-0044508 and prepared from the monomers vinylsulfonate, vinylacylamide and acrylamide may also be used. The use of each of these classes of polymers has advantages and disadvantages which must be weighed for particular applications.

Polyacrylamides are long chain polymers of acrylamide usually having a molecular weight of about 2 to 10 million or more. In partially hydrolyzed polyacrylamides, a portion of the amide groups are saponified into carboxylate groups producing a relatively inexpensive product. The desirable viscosity increase with respect to fresh water by a factor of about 10 to about 40 may be achieved in concentrations of about 0.3 to about 1 kg/m$^3$ To obtain the same viscosity increases in saline water, concentrations of about 1.5 to about 4 kg/m$^3$ are required. In high salinity waters it may be advantageous to use polyacrylamides having a lower degree of hydrolysis, i.e., a lower proportion of carboxylate groups.

Polysaccharides are condensed linear or branched saccharides with a molecular weight of from about 500,000 to several million, preferably one million and more, produced by organisms such as Xanthomonas Campestris or Fungus Sclerocium. To achieve an increase in viscosity of about 10 to 40 times that of water, concentrations between about 0.4 and about 2 kg/m$^3$ are required. Viscosity is largely independent of salinity. Because of the higher price of polysaccharides compared to polyacrylamides, economic considerations generally lead to the use of polyacrylamides under low salinity conditions and polysaccharides under high salinity conditions.

Water soluble cellulose ethers, especially hydroxyalkyl cellulose having an alkyl chain length of about one to about four carbon atoms, are also suitable for polymer flooding. Like polysaccharides, hydroxyethyl cellulose has a high tolerance for salt. But because of a limited molecular weight, concentrations of about 2 to 4 kg/m$^3$ are required for the desired viscosity increase. For these and other reasons the practical significance of the cellulose derivatives is limited.

The copolymers disclosed in European Pat. No. A2-0044508 and derived from the monomers vinylsulfonate, vinylacylamide and acrylamide exhibit a higher electrolyte and heat stability than the before mentioned classes of polymers. For this reason, this group of polymers is especially suitable for polymer flooding at high salinity conditions and high formation temperatures.

Most oil formations contain high salinity waters. For instance, the total salt content in North German formation brine is usually between about 120 and 250 kg/m$^3$ In accordance with the prior art, such formations may be initially flooded with fresh water followed by a polymer flood with partially hydrolyzed polyacrylamides in fresh water. However, this flooding procedure cannot be universally used. Some oil formations contain clays which swell upon contact with low salinity flooding media, resulting in blockage of the formation. Frequently, fresh water is not available in the required quantity or quality, or disposal means for the produced brine are insufficient. In such cases polymer flooding will be carried out with a brine-insensitive polymer in formation water, although the economic costs are greater than the costs of polyacrylamide flooding in fresh water.

Polymer retention is a serious factor which limits the operability of all polymer flooding processes. The formation pores containing crude oil and formation water side by side frequently have specific surfaces in the range of about 0.1 to 10 m$^2$/g, the actual value depending greatly on the type and quantity of the formation clay. All polymers used for tertiary oil recovery operations bond to a greater or lesser degree to formation rock, especially clays, by chemical adsorption.

Furthermore, high molecular weight polymers may also be mechanically retained by being hooked to the rock surface of the formation, or may be lost in dead end pores. Loss through flocculation may also occur. The total polymer loss during flooding is comprised of both losses through chemical adsorption and retention through mechanical effects. It is well known that mechanical retention loss with polyacrylamides is very high.

If the value of polymer lost by retention during the flooding operation in a given oil field would exceed the value of the additional oil to be recovered through the use of the polymer, the project is not economically feasible. A large number of known oil formations cannot be subjected to polymer flooding because of excessive polymer retention values.

Consequently, attempts have been made to inject so-called sacrificial chemicals into the formation either ahead of or together with oil-displacing polymers to inhibit chemical adsorption by preoccupation of adsorption sites. It is an important characteristic of such a sacrificial chemical that it is normally less expensive than the polymers to be protected.

In flooding with polyacrylamides, a "polymer-conserving agent", is proposed by A. C. Uzoigwe, F. C. Scanlon, R. L. Jewett in "Improvements in Polymer Flooding: The Programmed Slug and the Polymer- Conserving Agent", Journal of Petroleum Technology, January 1974, pp. 33–41. However, in spite of the great efforts made towards finding novel and more effective sacrificial chemicals, polymer flooding is still not widely used due to normally unfavourable economic performance caused by excessive retention.

It is known in liquid and gas chromatography that a silicate- or carbonate-containing carrier material can be effectively deactivated by a polyethylene glycol treatment and a subsequent thermal treatment. See, G. Alexander, "Preparation of Glass Capillary Columns", Chromatographia, Vol. 13, No. 10, October 1980, p. 657. But the reference requires a treatment at 280° C., probably attaining deactivation by unidentified products of thermal decomposition.

U.S. Pat. No. 3,692,113 discloses the use of a polyalkylene glycol of high molecular weight, possibly greater than one million, for further increasing the viscosity of the flooding medium. The method is preferably practiced with alkaline earth metals.

According to U.S. Pat. No. 3,882,939, a polyalkylene glycol of a molecular weight of 10,000 to 10,000,000, preferably from 1 to 6 million, may be injected in the formation together with a biopolymer to increase viscosity. The addition of the polyalkylene glycol is intended to influence the flow properties of the resulting solution at higher shear rates, which means that higher apparent viscosities will exist. This achieves improved mobility control of the flooding medium in the vicinity of the well.

U.S. Pat. No. 3,946,822 proposes flooding with a polyalkylene glycol ahead of flooding with a micellar or polymer solution to reduce contact between the displacing fluid, which is sensitive to di- or trivalent ions, and said ions. A polyethylene glycol having a molecular weight of 10,000 to 100,000,000 is preferred, with 1,000,000 to 6,000,000 being most preferred. Preferred water salinity is between the range of 1 to 20 kg/m$^3$ total salt content.

Under high-salinity conditions the retention of polymers used for tertiary oil recovery is especially excessive. See, J. Klein and A. Westerkamp, "Comparative Adsorption Studies Using a Polyacrylamide and a Polysaccharide Type Polymer in Oilfield Oriented Model Systems Simulating Enhanced Oil Recovery Conditions", Angew. Makromolekulare Chemie 92 (1980), FIG. 7, p. 24.

It is therefore the object of the invention to provide a process which even under high salinity conditions reduces chemical retention to such an extent that polymer flooding may be carried out.

SUMMARY OF THE INVENTION

It has been surprisingly found that retention of certain relatively high molecular weight polymers by formations containing high salinity brines is drastically reduced by employing aqueous solutions of polyethylene glycol, polypropylene glycol or both, having a molecular weight between about 600 and about 1200. The polyalkylene glycol may be used in a pre-flush solution or added to the polymer solution itself. It is also possible to use copolymers of ethylene oxide and propylene oxide within the specified molecular weight range, particularly those having a higher proportion of ethylene oxide.

BRIEF DESCRIPTION OF THE DRAWINGS

FIG. 3 illustrates the desorption of previously adsorbed polysaccharide by the later injection of polyethylene glycol 1000.

DETAILED DESCRIPTION

Figure 1:
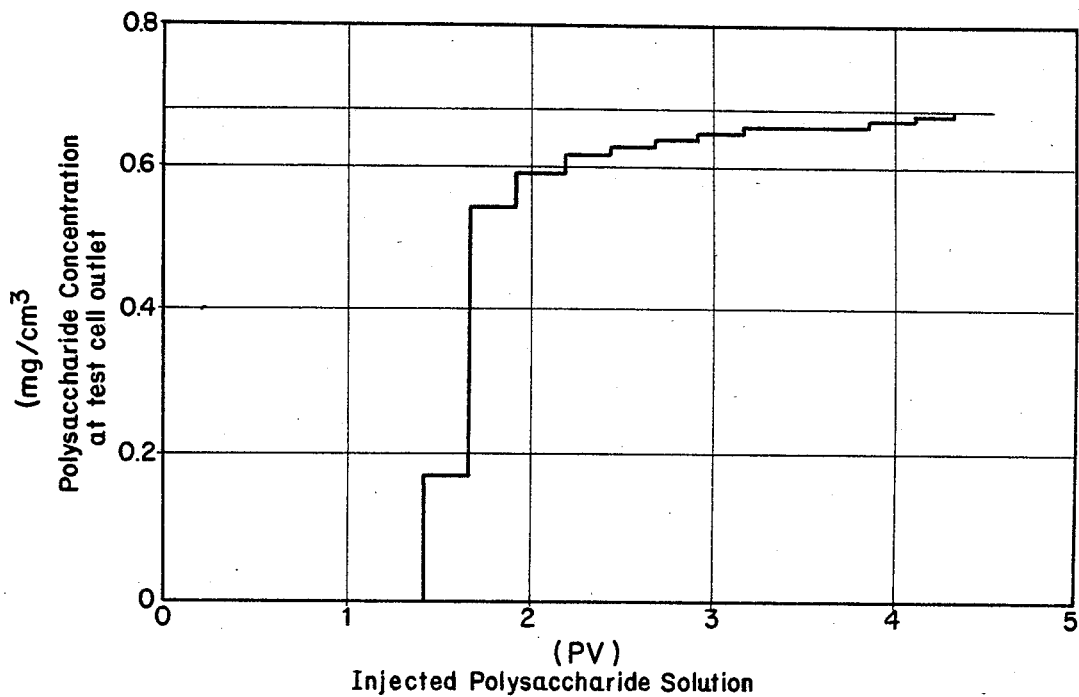
FIG. 1 plots polymer concentration in $\mu g/cm^3$ in the cell outlet against the injected solution of polymer in pore volumes.

The present invention substantially reduces the loss of relatively high molecular weight polymers to the formation through the injection of polyalkylene glycols in solution having molecular weights between about 600 and about 1200, most preferably about 800 to 1100. It is even possible to reverse to a large extent already existing polymer retention by post-flooding with polyalkylene glycols of the same molecular weight range. The results of the present invention are surprising because they can be achieved only with polyalkylene glycol within the specified molecular weight range. Higher or lower molecular weight polyalkylene glycols are of little help in preventing the adsorption of relatively high molecular weight polymers in high salinity formations.

The decrease in polymer retention with the practice of the present invention varies with the different polymer classes. The instant invention offers the most substantial reductions in polymer loss with polysaccharides and cellulose ethers such as hydroxyethyl cellulose. With polyacrylamides, polymer loss is reduced, but not as significantly as with polysaccharides. The present method also reduces formation loss of copolymers formed from the monomers vinylsulfonate, vinylacylamide and acrylamide. The invention is most effective when the sacrificial agent has a molecular weight substantially less than the polymers it is protecting.

The distinctly different results are due to different mechanisms of polymer retention which have varying degrees of importance for different chemical structures. Only when chemical adsorption is involved can retention be effectively reduced by means of polyalkylene glycol in the given molecular weight range. Mechanical retention can be prevented only little or not at all.

According to the invention, it is preferred to use polyethylene glycol having a molecular weight of from about 800 to about 1100. The optimum molecular weight of the preferably used polyethylene glycol is approximately 1000. The optimum quantity of polyethylene glycol depends on the adsorption capacity of the formation and should be determined in laboratory tests. Possible slug concentrations range from about 1 to about 100 kg/m$^3$ of polyethylene glycol. Because polypropylene glycol and ethylene oxide/propylene oxide copolymers behave so similarly to polyethylene glycol in enhanced oil recovery applications, the same preferred molecular weight, concentration and quantity ranges also apply to polypropylene glycol and ethylene oxide/propylene oxide copolymers. Concentration and quantity of the polyalkylene glycol slug is dependent upon the material of the formation which may require between about 20 and 500 $\mu g$ of polyalkylene glycol per gram of contacted formation rock.

In accordance with the prior art the concentration of the polymer slug is chosen to give at a shear rate of 1

$s^{-1}$ a viscosity about 10 to 50 times higher than the viscosity of water.

These desired viscosities give slug concentrations of between about 0.4 and about 3 kg/m³ depending on the viscosity yield of the actually used product and the conditions prevailing in the formation, especially temperature and salinity conditions. Optimum size of the polymer slug be determined by computer simulation and may be between about 0.1 and about 1 pore volume, usually between about 0.3 and about 0.8 pore volume. Optionally, the slug concentration may be stepped down to zero towards the end of the slug.

EXAMPLES 1-5

The solubility of polyethylene glycol (PEG) greatly depends on the temperature and salinity of the mixing water and the average molecular weight of the polyethylene glycol. Solubility decreases with increasing salinity, increasing temperature and increasing molecular weight of PEG.

The solubilities of PEG having varying molecular weights were tested by measuring the cloud point at the conditions of a North German formation (temperature 60° C., total salt content 170 kg/m³, of which 7.4 kg/m³ are divalent cations). The polyethylene glycols were dissolved at a concentration of 2 g/l in synthetic formation water having a total salt content of 170 kg/m³ The solution was heated and the temperature was measured at the point at which the glycols were dissolved and the solution clouded. Table I shows the cloud point as a function of the molecular weight of the PEG.

TABLE I

| PEG Products | Manufacturer | Approximate Molecular Weight (g/mol) | Cloud Point (°C.) |
|---|---|---|---|
| PEG 600 | Hoechst AG | 600 | >103 |
| PEG 1,000 | " | 1,000 | >103 |
| PEG 10,000 | " | 10,000 | 73 to 75 |
| PEG 35,000 | " | 35,000 | 63.5 to 65 |
| Polyox Coagulant | Union Carbide | 5,000,000 | 52 to 54 |

Results indicated that highest-molecular weight product was no longer soluble at the concerned formation conditions.

EXAMPLES 6-15

The polysaccharide used in the retention measurements was the trademarked product RHODOPOL® 23 RA sold by Rhone Poulenc, a polysaccharide made from Xanthomonas Campestris and having a molecular weight of several millions. The polysaccharide is predominantly composed of the monosaccharides glycose and mannose with some glucuronic acid salts.

PEG was tested as a sacrificial agent with varying molecular weights in core material from a North German formation. The PEG was injected into synthetic formation water ahead of the polymer solution at a concentration of 2 kg/m³ and a pore volume of 0.3 to 0.4.

In the test series, the pack length was 28 to 30 cm with a cross-section of 2.8 to 3 cm. Typically, the initial quantities of core material were about 300 g, and the resulting pore volumes (PV) were about 65 to 70 cm³ The concentrations of polysaccharide were between 0.64 and 0.70 g/l with pumping rates of 4 cm³/h.

The polysaccharide retention measurement was performed by flooding an oil-free pack of crushed core material filled with synthetic formation water at 60° C.

with a solution of polysaccharide, and rheometrically determining the respective polysaccharide concentration in the outlet. From the delayed breakthrough of the polymer it is possible to calculate the amount of polymer retained and thence the polymer retention giving due consideration to the dead volumes at the beginning and end of the pack. See FIG. 1, in which the polymer concentration in the outlet is plotted in mg/cm³ against the injected solution of polymer in pore volumes (PV). Table II shows the results of the test series.

TABLE II

| Ex. No. | Molecular Weight of Sacrificial Agent (g/mol) | Pore Volume | Polysaccharide Retention (μg/g) |
|---|---|---|---|
| 6 | no preflooding | | 116 |
| 7 | no preflooding | | 131 |
| 8 | 600 | 0.4 | 71 |
| 9 | 1,000 | 0.3 | 10 |
| 10 | 6,000 | 0.3 | 87 |

Results indicated that the PEG having a molecular weight of about 1,000 was the most effective. Subsequently, the flood quantity of PEG 1000 was varied at the same slug concentration of 2 kg/m³ to determine the absolute quantity of PEG required. The results are listed both in Table III and in FIG. 2.

TABLE III

| Ex. No. | Pore Volume of PEG 1000 | Polysaccharide Retention (μg/g) |
|---|---|---|
| 11 | no preflooding | 116 |
| 12 | no preflooding | 131 |
| 13 | 0.1 | 75 |
| 14 | 0.15 | 45.6 |
| 15 | 0.3 | 10.0 |

Figure 2:
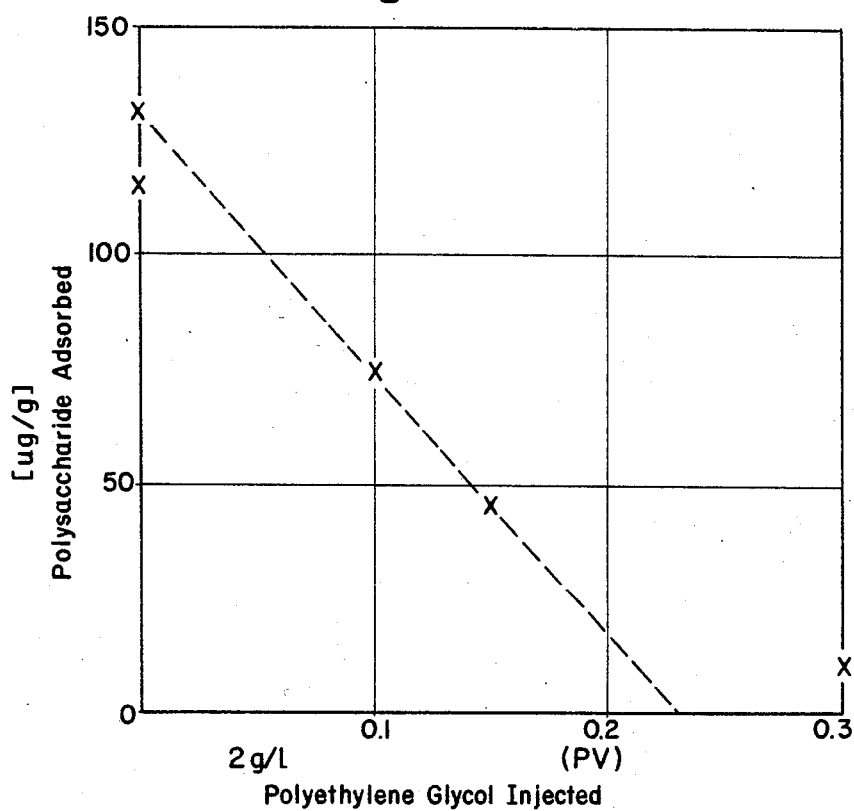
FIG. 2 the polysaccharide adsorbed against the pore volume of polyethylene glycol 1000 injected.

A plotting of the results in FIG. 2 indicates that at the special test conditions a pore volume of about 0.23 is required in order to achieve the optimum reduction in the polymer retention, which corresponds to about 92 μg of PEG 1000 per g of rock.

EXAMPLES 16-19

Additional retention values, also with high molecular weight PEG as the sacrifical agent, were determined on core material of another North German formation. The results are listed in Table IV.

TABLE IV

| Ex. No. | Molecular Weight of Sacrificial Agent (g/mol) | Pore Volume | Polysaccharide Retention (μg/g) |
|---|---|---|---|
| 16 | no preflooding | | 118 |
| 17 | 1,000 | 0.26 | 29 |
| 18 | 10,000 | 0.30 | 67 |
| 19 | 35,000 | 0.30 | 67 |

With this formation material, PEG 1000 was also the most effective.

In Ex. 16, no PEG was initially injected. After an injected volume of 5.8 pore volumes of polysaccharide solution, the polysaccharide was injected together with 2 kg/m³ of PEG 1000 in a second step. As will be evident from FIG. 3, the adsorbed polysaccharide was substantially desorbed. As compared to polysaccharide, the PEG 1000 is preferentially adsorbed.

By the addition of PEG to the second half of the polysaccharide slug it is possible to produce in the formation very high concentrations and thus, very high apparent viscosities due to the desorption effect. Without the use of PEG, comparably high concentrations of polysaccharide would be realized, if at all possible, only with very high injection pressures or low injection rates.

If at a later stage of a polysaccharide flooding operation it becomes apparent that the flooding effect is small because of excessive retention of the polysaccharide, the flooding effect may be improved by post-injection of PEG.

EXAMPLES 20-22

On the basis of the above reported results, experiments were carried out with the formation material and brine of another North German formation (total salinity 140 kg/m$^3$, temperature 90° C.). Because of the high formation temperature, a copolymer produced according to European Patent No. A2-0044508 from vinylsulfonate, vinylacylamide and acrylamide with a weight over several million, was used instead of a polysaccharide.

An oil-free pack of crushed core material filled with synthetic formation brine was flooded at 90° C. with about 1.5 to 2 pore volumes of copolymer solution at a concentration of about 1.2 g/l. Potassium thiocyanate was added as a tracer to yield a concentration of 5 g/l thiocyanate ions. The respective copolymer concentration was determined rheometrically at the outlet.

To determine the influence of PEG on retention of copolymer, solutions with varying concentrations of PEG 1000 having a slug size of 0.4 PV were injected ahead of the polymer solution. Table V shows the results of the test series.

TABLE V

| Ex. No. | Concentration of PEG 1000 (g/l) | Amount of PEG 1000 (μg/g of core material) | Copolymer Retention (μg/g) |
| --- | --- | --- | --- |
| 20 | no preflooding | | 149 |
| 21 | 2 | 205 | 41 |
| 22 | 4 | 410 | 43 |

The initial amount of about 200 μg PEG 1000 per g core material in Ex. 21 was sufficient to reduce the total loss of copolymer by about 73%. Twice the concentration of PEG 1000 in Ex. 22 yielded about the same results as Ex. 21 within the accuracy of measurement.

EXAMPLES 23-25

A further series of tests investigated the extent to which PEG 1000 injection affects the desorption of already adsorbed copolymer. The amount of PEG 1000 determined as being sufficient for preventing copolymer adsorption when preflooded was dissolved in the last 0.2 PV of the copolymer slug. No preflooding occurred. Table VI shows the results of the test series.

TABLE VI

| Ex. No. | Amount of PEG 1000 (μg/g of core Material) | Copolymer Retention (μg/g) |
| --- | --- | --- |
| 23 | — | 149 |
| 24 | 205 | 87 |

Copolymer retention was reduced by about 42%. Although the PEG was able to partly desorb already adsorbed copolymer, the efficiency was less pronounced than in the test series with polysaccharides. It is believed that PEG adsorption was less specific for this formation core material or a greater amount of the copolymer loss was caused by mechanical retention.

Under the same conditions described above, an additional run was carried out with the polyacrylamide sold by BASF under the trademark SEPAFLOOD ® CE 5093. The BASF polyacrylamide has a low degree of hydrolysis (about 3%) and an average molecular weight of several million. Table VII shows the results.

TABLE VII

| | Polymer Retention (μg/g) | |
| --- | --- | --- |
| | Without PEG 1000 | With PEG 1000 (preflooded) |
| Ex. 25 CE 5093 | 212 | 189 |

The measured reduction in polymer loss was much less than in the preceding experiments with other polymers but was still recognizable. It is believed that these polyacrylamides are subject to mechanical retention and flocculation to a greater extent than polysaccharides and the above tested copolymers.

The process of the present invention is suitable for flooding with polymers, preferably hydrophilic polymers, which have a tendency to chemically adsorb on formation rock. The method may also be used with other secondary flooding methods in which aqueous viscous polymer solutions are used for mobility control with substances such as biocides, surfactants or deoxidants.

Many other variations and modifications may be made in the concept described above by those skilled in the art without departing from the concept of the present invention. Accordingly, it should be clearly understood that the concepts disclosed in the description are illustrative only and are not intended as limitations on the scope of the invention.

What is claimed is:

1. A process for reducing the loss of relatively high molecular weight polymers to a subterranean formation containing high salinity connate water during an enhanced oil recovery operation in a formation penetrated by at least one injection well and at least one production well, which comprises:
   injecting into the formation a sacrificial agent in solution selected from the group consisting of polyethylene glycol, polypropylene glycol, a mixture of polyethylene glycol and polypropylene glycol, and ethylene oxide/propylene oxide copolymer;
   said sacrificial agent having an average molecular weight between about 600 and about 1200.

2. The process of claim 1, wherein the sacrificial agent is injected into the formation prior to polymer injection.

3. The process of claim 1, wherein the sacrificial agent is injected into the formation in solution with the polymer.

4. The process of claim 1, wherein the sacrificial agent is injected into the formation after polymer injection.

5. The process of claim 1, wherein the sacrificial agent has an average molecular weight between about 800 and about 1100.

6. The process of claim 1, wherein the concentration of sacrificial agent in injected solution is about 1.0 to about 100 kg/m$^3$.

7. The process of claim 6, wherein about 0.1 to about 1.0 pore volumes of sacrificial agent solution is injected into the formation.

8. A process for reducing the loss of polysaccharide polymers having a molecular weight greater than about 500,000 to a subterranean formation containing high salinity connate water during an enhanced oil recovery operation in a formation penetrated by at least one injection well and at least one production well, which comprises:

injecting into the formation a solution containing about 1.0 to about 100 kilograms of polyethylene glycol per cubic meter of solution, said polyethylene glycol having an average molecular weight of about 800 to about 1100.

* * * * *